(12) United States Patent
Imaizumi et al.

(10) Patent No.: US 10,688,706 B2
(45) Date of Patent: Jun. 23, 2020

(54) HONEYCOMB STRUCTURE FORMING DIE

(71) Applicant: NGK INSULATORS, LTD., Nagoya (JP)

(72) Inventors: Yuta Imaizumi, Nagoya (JP); Kazuhiko Hamatsuka, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 344 days.

(21) Appl. No.: 15/664,429

(22) Filed: Jul. 31, 2017

(65) Prior Publication Data

US 2018/0043597 A1 Feb. 15, 2018

(30) Foreign Application Priority Data

Aug. 9, 2016 (JP) .................................. 2016-156975
Nov. 11, 2016 (JP) .................................. 2016-220875

(51) Int. Cl.
| | |
|---|---|
| *B29C 48/11* | (2019.01) |
| *B28B 3/26* | (2006.01) |
| *B29C 48/30* | (2019.01) |
| *B29C 48/00* | (2019.01) |
| *B29L 31/60* | (2006.01) |

(52) U.S. Cl.
CPC .............. *B29C 48/11* (2019.02); *B28B 3/269* (2013.01); *B29C 48/022* (2019.02); *B29C 48/30* (2019.02); *B29L 2031/608* (2013.01)

(58) Field of Classification Search
CPC ....... B29C 48/11; B29C 48/30; B29C 48/022; B29L 2031/608; B28B 3/269
USPC ......................................................... 425/461
See application file for complete search history.

(56) References Cited

U.S. PATENT DOCUMENTS

| | | | | |
|---|---|---|---|---|
| 3,354,250 A | * | 11/1967 | Killoran ................... | D01D 1/04 264/211.22 |
| 4,875,846 A | * | 10/1989 | Reinbold ................. | D01D 1/06 425/186 |
| 5,108,685 A | | 4/1992 | Kragle | |

(Continued)

FOREIGN PATENT DOCUMENTS

| | | |
|---|---|---|
| JP | 04-332604 A1 | 11/1992 |
| JP | 2013-132879 A1 | 7/2013 |

(Continued)

OTHER PUBLICATIONS

Machine Translation of JP 2013-132879 (Year: 2013).*

*Primary Examiner* — Leith S Shafi
(74) *Attorney, Agent, or Firm* — Burr & Brown, PLLC

(57) ABSTRACT

The honeycomb structure forming die includes a first die in which a central region on the side of a kneaded material discharging surface has a convex region projecting toward a downstream side in an extruding direction of a kneaded material, a ring-shaped second die, and a reticulated member interposed between the first die and the second die. In the first die, first kneaded material introducing holes are formed and latticed first slits are formed on the side of the kneaded material discharging surface of the convex region, and in the second die, there are formed second kneaded material introducing holes and latticed second slits communicating with the second kneaded material introducing holes, and movement of a kneaded material is performed between the first kneaded material introducing hole and the second kneaded material introducing hole through meshes of the reticulated member.

11 Claims, 9 Drawing Sheets

(56) References Cited

U.S. PATENT DOCUMENTS 8,834,783 B2 * 9/2014 Soga .................. B28B 3/206
                                                                                                     264/630
2015/0137431 A1   5/2015 Hayashi

FOREIGN PATENT DOCUMENTS

| JP | 2013-132881 A1 | 7/2013 |
| JP | 2015-096310 A1 | 5/2015 |

* cited by examiner ized cycles in a plane perpendicular to an extending direction of the cells. Heretofore, there has been one type of cell structure in the above plane of one honeycomb structure, but in recent years, there has been suggested a honeycomb structure having two or more types of cell structures in the above plane for the purpose of improvement of an exhaust gas purifying efficiency, or the like. For example, there has been suggested a honeycomb structure in which a central portion is different from a circumferential portion in cell density or cell shape in a plane perpendicular to a cell extending direction, whereby the honeycomb structure has two types of cell structures in the above plane.
HONEYCOMB STRUCTURE FORMING DIE "The present application is an application based on JP-2016-156975 filed on Aug. 9, 2016 and JP-2016-220875 filed on Nov. 11, 2016 with Japan Patent Office, the entire contents of which are incorporated herein by reference."

BACKGROUND OF THE INVENTION

Field of the Invention

The present invention relates to a honeycomb structure forming die, and more particularly, it relates to a honeycomb structure forming die which is capable of forming, in a high quality, a honeycomb formed body having a central portion different from a circumferential portion in cell structure.

Description of the Related Art

Heretofore, a honeycomb structure onto which a catalyst is loaded has been used for a purifying treatment of toxic substances such as HC, CO and $NO_x$ included in an exhaust gas emitted from an engine of a car or the like. Further the honeycomb structure is also used as an exhaust gas purifying filter by plugging open ends of cells defined with porous partition walls.

Honeycomb structures are pillar-shaped structures each including partition walls defining a plurality of cells which become through channels for an exhaust gas. Such a honeycomb structure has a cell structure in which a plurality of cells are regularly arranged at predetermined cycles in a plane perpendicular to an extending direction of the cells. Heretofore, there has been one type of cell structure in the above plane of one honeycomb structure, but in recent years, there has been suggested a honeycomb structure having two or more types of cell structures in the above plane for the purpose of improvement of an exhaust gas purifying efficiency, or the like. For example, there has been suggested a honeycomb structure in which a central portion is different from a circumferential portion in cell density or cell shape in a plane perpendicular to a cell extending direction, whereby the honeycomb structure has two types of cell structures in the above plane.

This honeycomb structure is manufactured by forming a kneaded material including a ceramic forming raw material with an extruding die to prepare a honeycomb formed body and then drying and firing the prepared honeycomb formed body. For example, the die is prepared as a honeycomb structure forming die by forming, in a die substrate made of a metal, back holes into which the kneaded material is introduced and slits which communicate with the back holes (e.g., see Patent Documents 1 to 4). Hereinafter, the honeycomb structure forming die will be referred to simply as "a forming die" or "a die" sometimes.

[Patent Document 1] JP-A-2015-096310
[Patent Document 2] JP-A-2013-132879
[Patent Document 3] JP-A-2013-132881
[Patent Document 4] JP-A-H04-332604

SUMMARY OF THE INVENTION

For example, a die described in Patent Document 1 includes a first mold positioned on an upstream side in an extruding direction of a raw material and a second mold positioned on a downstream side. The above first mold has convex regions projecting from a periphery on the downstream side in the extruding direction, and the above second mold has through-holes which fit with the convex regions. In the die described in Patent Document 1, the convex regions of the first mold are inserted into the through-holes of the second mold to combine the first mold and the second mold into one die.

However, the die described in Patent Document 1 has the problem that there are restrictions on design when the die is used in forming a honeycomb formed body to prepare a honeycomb structure having two types of cell structures. In other words, usually in the die to form the honeycomb formed body, "latticed slits" corresponding to a cell structure of the honeycomb formed body are formed on the side of a kneaded material discharging surface of a die substrate. Further in such a die, back holes are formed as raw material supply holes which communicate with intersection points of the latticed slits. In the die described in Patent Document 1, in circumstances where the first mold is different from the second mold in shape of the respective slits, it is difficult to completely match all back holes (i.e., first raw material supply holes) in the first mold with all back holes (i.e., second raw material supply holes) in the second mold. When all the back holes do not match one another and when the first mold and the second mold are combined into one piece, movement of the kneaded material in the die is obstructed and it becomes difficult to perform uniform extrusion. Consequently, in the die described in Patent Document 1, it is necessary to select the shapes of the respective slits formed in the first mold and the second mold so that the above-mentioned movement of the kneaded material is not obstructed, and a degree of freedom in design is very low.

Each of dies described in Patent Documents 2 and 3 is not a die to form a honeycomb formed body having two types of cell structures, but is a die for the purpose of improvement of cell quality only in an outermost circumferential portion. Furthermore, the dies described in Patent Documents 2 and 3 have the problem that the dies are not compatible with formation of various honeycomb formed bodies in which shapes of two types of cell structures and their formation regions vary over broad ranges. For example, a honeycomb structure having two types of cell structures occasionally has a boundary wall disposed to surround the cell structure of a central portion in a boundary between the cell structure of the central portion and the cell structure of a circumferential portion. During extrusion, the boundary wall requires a large amount of kneaded material of a forming raw material as compared with partition walls constituting the cell structures of the central portion and the circumferential portion. When the honeycomb formed body having such a boundary wall as described above is formed with one of the dies described in Patent Documents 2 and 3, the requirement exceeds supply of the kneaded material to form the boundary wall, and formation defects might be caused in the boundary wall and its vicinity. Furthermore, each of the dies described in Patent Documents 2 and 3 has been developed for the purpose of the improvement of the cell quality only in the outermost circumferential portion, and hence there is a problem in strength of a shell region. When the problem is to be solved only by simply enlarging a forming range of the shell region, there is the fear of the problem that the shell region is deformed.

A die described in Patent Document 4 has a structure in which adjacent die bodies are tightened with wedges or engaged with each other by utilizing a pressing pressure, and hence there is the problem that pressure resisting properties to a kneaded material are low and that the die is easy to break. The die described in Patent Document 4 also has the problem that positional shifts of back holes are likely to be induced and that formation defects are likely to be generated.

On the other hand, the honeycomb formed body having two types of cell structures occasionally has a boundary wall defining the two types of cell structures in a boundary between a central portion of the honeycomb formed body and a circumferential portion thereof. An amount of a kneaded material to be consumed for the boundary wall during extrusion is different from that of a kneaded material to be consumed for partition walls to be formed around the boundary wall. Consequently, the honeycomb formed body having the two types of cell structures has the problem that formation defects are likely to be generated especially around the boundary wall. For example, when a type or the like of kneaded material of the forming raw material is changed in performing the extrusion, a fluidity of the kneaded material varies. Therefore, the die to extrude the honeycomb formed body having the boundary wall has very poor versatility.

The present invention has been developed in view of the above-mentioned problems, and an object thereof is to provide a honeycomb structure forming die which is capable of forming, in a high quality, a honeycomb formed body having a central portion different from a circumferential portion in cell structure.

According to the present invention, there is provided a honeycomb structure forming die as follows.

According to a first aspect of the present invention, a honeycomb structure forming die is provided including:

a first die which is disposed on an upstream side in an extruding direction of a kneaded material of a forming raw material and in which a central region on the side of a kneaded material discharging surface has a convex region projecting toward a downstream side in the extruding direction; and a ring-shaped second die which is disposed on the downstream side of the first die and which possesses a shape complementary to the convex region, wherein in the central region of the first die, first kneaded material introducing holes and latticed first slits communicating with the first kneaded material introducing holes are formed, in a circumferential region surrounding the central region of the first die, the first kneaded material introducing holes are formed to pass through the circumferential region of the first die, and in the ring-shaped second die, there are formed second kneaded material introducing holes into which the kneaded material discharged from the first kneaded material introducing holes formed in the circumferential region of the first die is introduced, and latticed second slits communicating with the second kneaded material introducing holes, the honeycomb structure forming die having a clearance region to extrude the kneaded material into a ring shape, between an outer peripheral surface of the convex region of the first die and an inner peripheral surface of the ring-shaped second die, the honeycomb structure forming die further including a reticulated member interposed between the first die and the second die, wherein movement of the kneaded material is performed between the first kneaded material introducing hole and the second kneaded material introducing hole through meshes of the reticulated member.

According to a second aspect of the present invention, the honeycomb structure forming die according to the above first aspect is provided, wherein a shape of the first slits is different from a shape of the second slits.

According to a third aspect of the present invention the honeycomb structure forming die according to the above first or second aspects is provided, wherein a diameter of a linear material constituting the reticulated member is from 0.030 to 0.500 mm.

According to a fourth aspect of the present invention, the honeycomb structure forming die according to any one of the above first to third aspects is provided, wherein the number of meshes per centimeter of the reticulated member is from 3.9 to 130.

According to a fifth aspect of the present invention, the honeycomb structure forming die according to any one of the above first to fourth aspects of the present invention is provided, including two or more reticulated members, wherein the reticulated member interposed between the first die and the second die is replaced, whereby a distance between the first die and the second die in the extruding direction is changeable.

According to a sixth aspect of the present invention, the honeycomb structure forming die according to any one of the above first to fifth aspects is provided, including two or more types of second dies which are different in shape of the second slits, wherein the second dies are replaceable.

According to a seventh aspect of the present invention, the honeycomb structure forming die according to any one of the above first to sixth aspects is provided, wherein a ratio of an area of the central region of the first die to an area of an end face of a honeycomb formed body to be extruded is from 30 to 70%.

According to an eighth aspect of the present invention, the honeycomb structure forming die according to any one of the above first to seventh aspects is provided, wherein slits surrounding one cell among the first slits and slits surrounding one cell among the second slits extend in mutually intersecting directions.

According to a ninth aspect of the present invention, the honeycomb structure forming die according to any one of the above first to eighth aspects is provided, wherein an arranging direction of a cell structure of the honeycomb formed body which is to be extruded through the first slits and an arranging direction of a cell structure of the honeycomb formed body which is to be extruded through the second slits extend in mutually intersecting directions.

According to a tenth aspect of the present invention, the honeycomb structure forming die according to any one of the above first to ninth aspects is provided, further including a ring-shaped space acquiring member interposed between the first die and the second die, wherein the reticulated member is disposed in an inner region of the ring-shaped space acquiring member.

According to an eleventh aspect of the present invention, the honeycomb structure forming die according to any one of the above first to tenth aspects is provided, wherein in the first die, the central region is the same as the circumferential region in an opening diameter of the first kneaded material introducing hole and an interval between the first kneaded material introducing holes.

A honeycomb structure forming die of the present invention includes a first die in which a central region on the side of a kneaded material discharging surface has a convex region projecting toward a downstream side in an extruding direction of a kneaded material, and a ring-shaped second die which possesses a shape complementary to the convex region of the first die. Furthermore, the honeycomb structure forming die of the present invention further includes "a reticulated member" interposed between the first die and the second die. Thus, the reticulated member is disposed, whereby meshes of the reticulated member form through channels in which movement of a kneaded material is performed between a first kneaded material introducing hole and a second kneaded material introducing hole, between the surface of a circumferential region of the first die on the downstream side and the surface of the second die on an upstream side.

The honeycomb structure forming die of the present invention is capable of forming, in a high quality, a honeycomb formed body having a central portion different from a circumferential portion in cell structure. In other words, in the honeycomb structure forming die of the present invention, the first kneaded material introducing holes communicate with the second kneaded material introducing holes via the meshes of the reticulated member. Consequently, even when positions of the first kneaded material introducing holes of the first die do not match positions of the second kneaded material introducing holes of the second die in the extruding direction, the movement of the kneaded material is performed between the first kneaded material introducing hole and the second kneaded material introducing hole via the meshes of the reticulated member. Especially, in a region other than a region where linear materials of the reticulated member are superimposed on each other, the movement of the kneaded material is also performed between the meshes of the reticulated member, and hence when the movement of the kneaded material is performed through the meshes, a flow rate distribution of the kneaded material to be introduced into the second kneaded material introducing holes can be uniformized. Therefore, the honeycomb structure forming die of the present invention is capable of uniformizing an amount of the kneaded material to be discharged from second slits of the second die, and forming the honeycomb formed body in a high quality.

Furthermore, according to the honeycomb structure forming die of the present invention, even when a back pressure is generated in the die at a time of die replacement or at the stop of ram molding, it is possible to effectively inhibit deformation of the second die.

Furthermore, in the honeycomb structure forming die of the present invention, the reticulated member is a member separated from the first die and the second die, and hence a size of a space formed by the reticulated member is easily changeable. In other words, when a thickness of the reticulated member is changed, a distance of the space in the extruding direction is adjustable. Furthermore, by the adjustment of the distance of the space in the extruding direction, it is possible to adjust an amount of the kneaded material to be introduced into a clearance region to extrude a boundary wall. For example, when a type of kneaded material is changed or when the second die is replaced with another second die having a different second slit shape, it is possible to appropriately adjust the amount of the kneaded material to be introduced into the above-mentioned clearance region, and it is possible to form the honeycomb formed body in a high quality. The honeycomb structure forming die of the present invention is remarkably excellent in versatility.

DESCRIPTION OF THE PREFERRED EMBODIMENTS

Hereinafter, embodiments of the present invention will specifically be described with reference to the drawings. It should be understood that the present invention is not restricted to the following embodiments and that design changes, improvements and the like are suitably addable on the basis of ordinary knowledge of a person skilled in the art without departing from the gist of the present invention.

Figure 1:
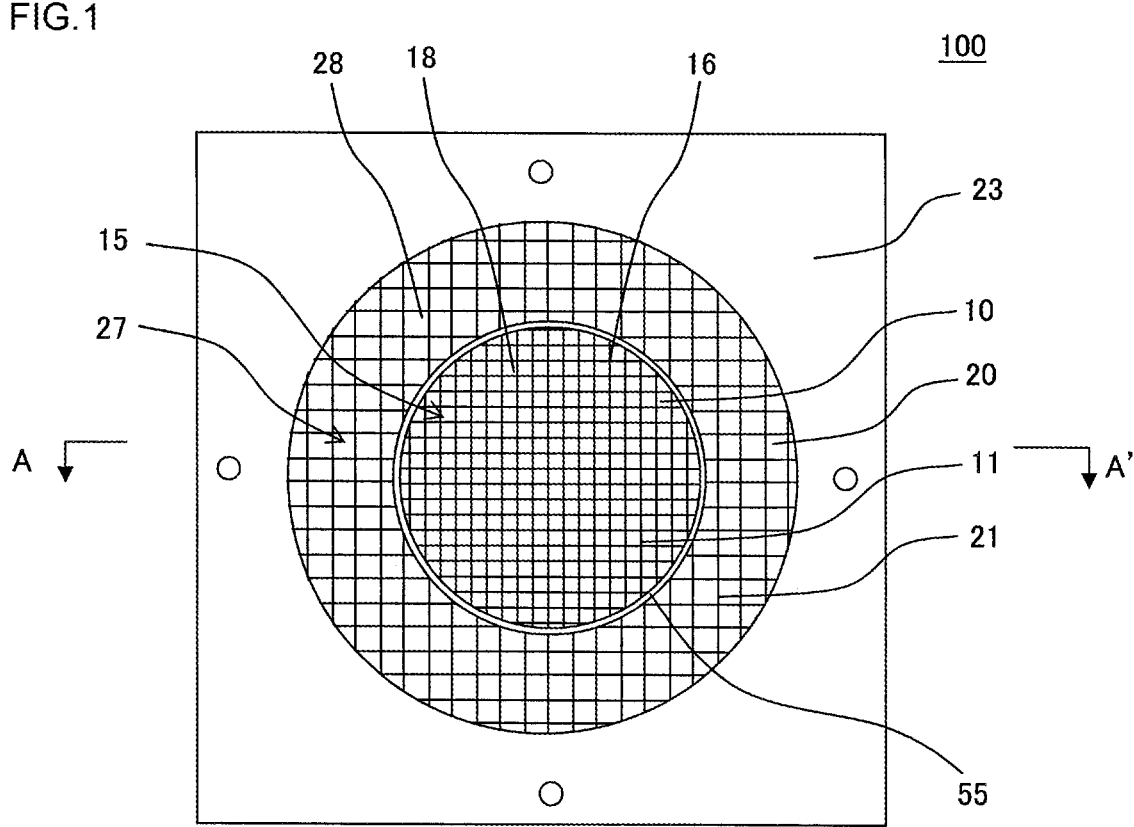
FIG. 1 is a plan view schematically showing a kneaded material discharging surface side of one embodiment of a honeycomb structure forming die of the present invention.
Figure 2:
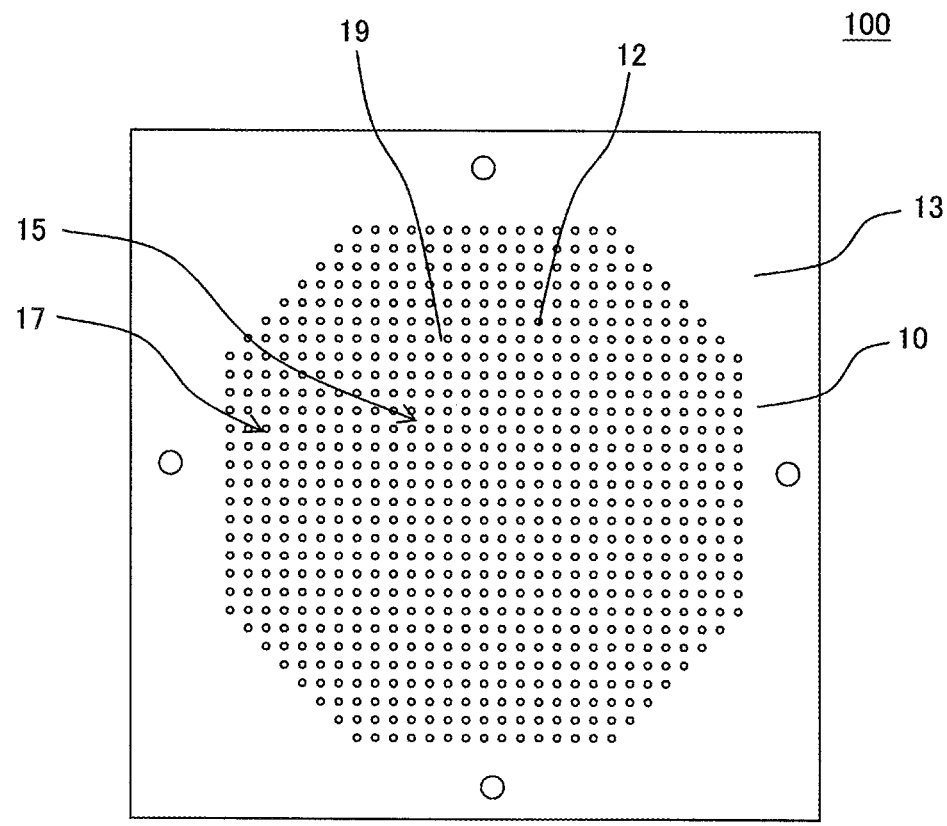
FIG. 2 is a plan view of a kneaded material introducing surface side of the honeycomb structure forming die shown in FIG. 1.
Figure 3:
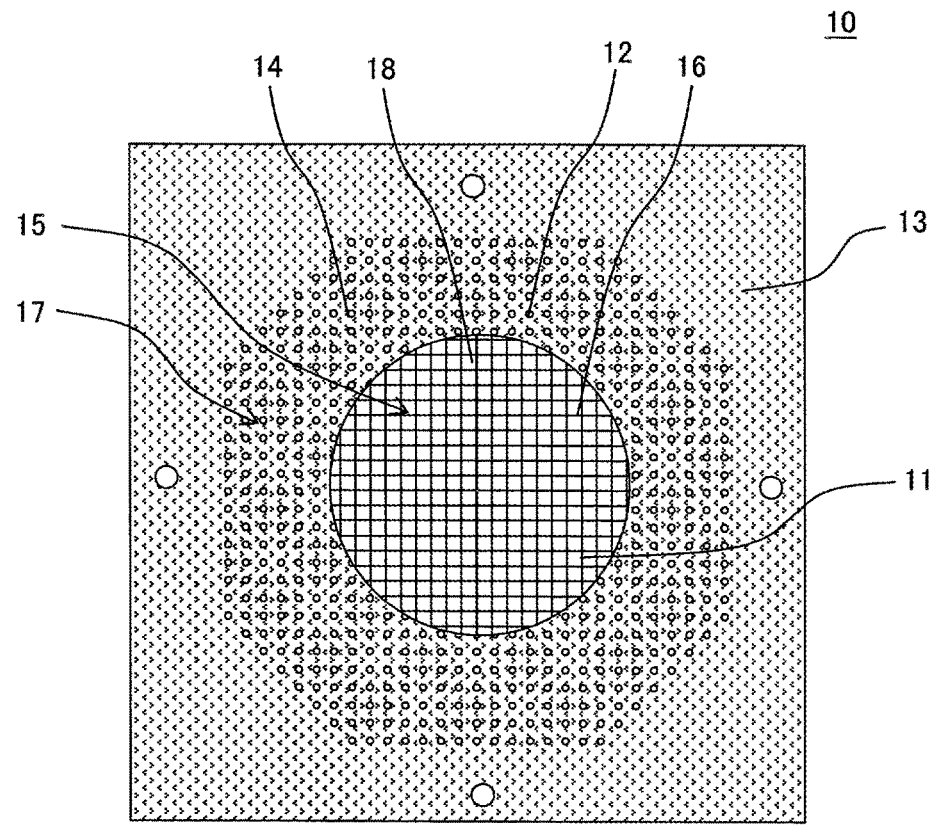
FIG. 3 is a plan view of a kneaded material discharging surface side of a first die constituting the honeycomb structure forming die shown in FIG. 1.
Figure 4:
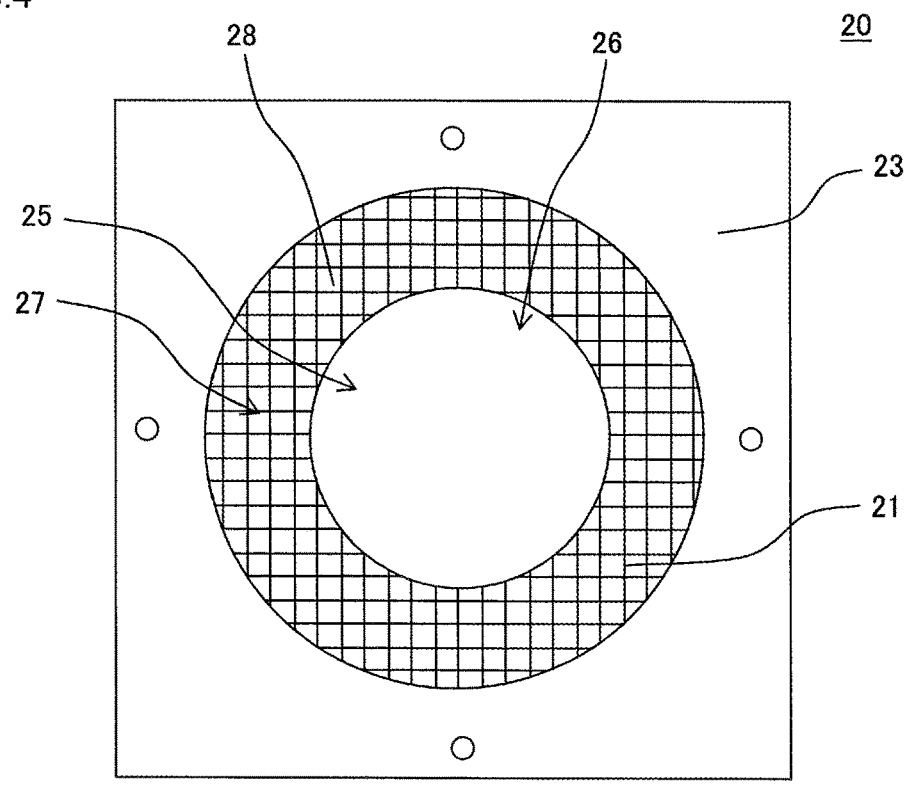
FIG. 4 is a plan view of a kneaded material discharging surface side of a second die constituting the honeycomb structure forming die shown in FIG. 1.
Figure 5:
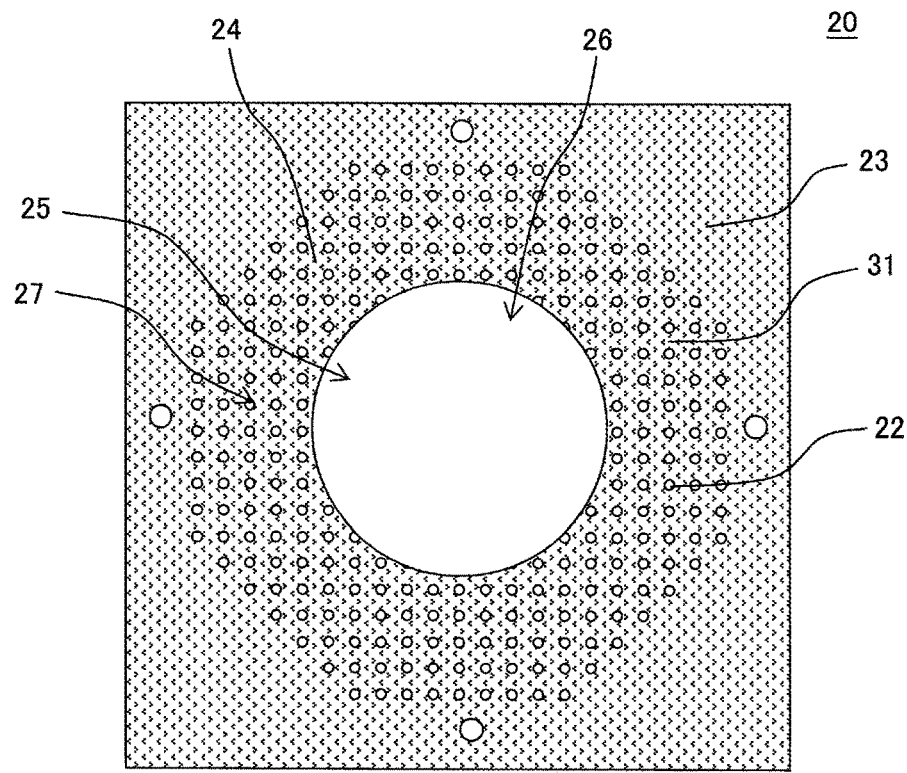
FIG. 5 is a plan view of a kneaded material introducing surface side of the second die constituting the honeycomb structure forming die shown in FIG. 1.
Figure 6:
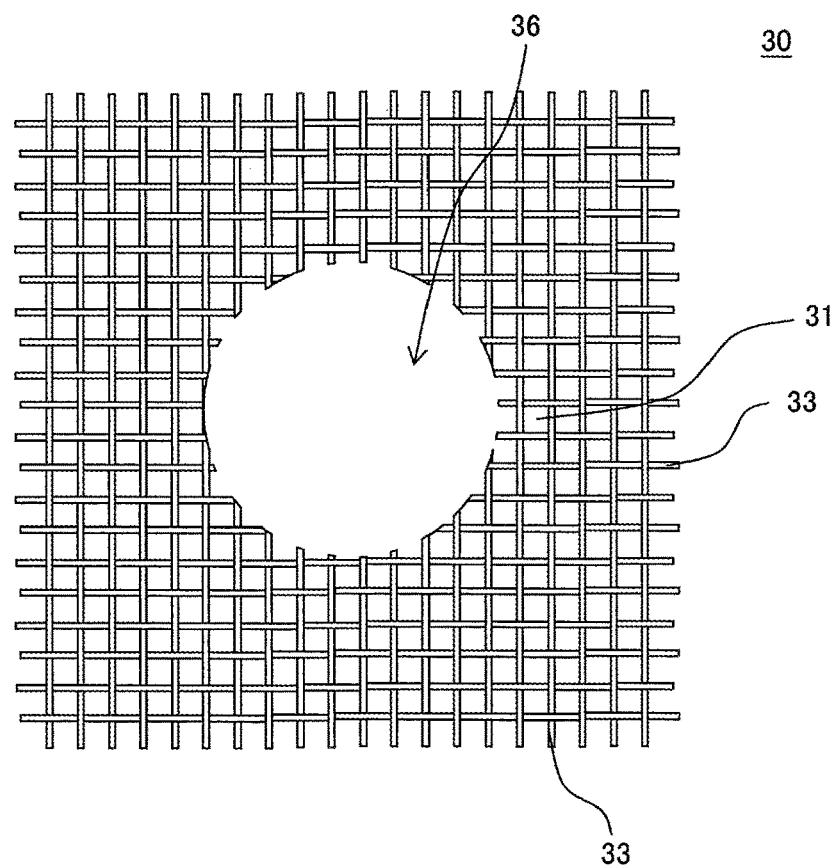
FIG. 6 is a plan view of a reticulated member constituting the honeycomb structure forming die shown in FIG. 1.
Figure 7:
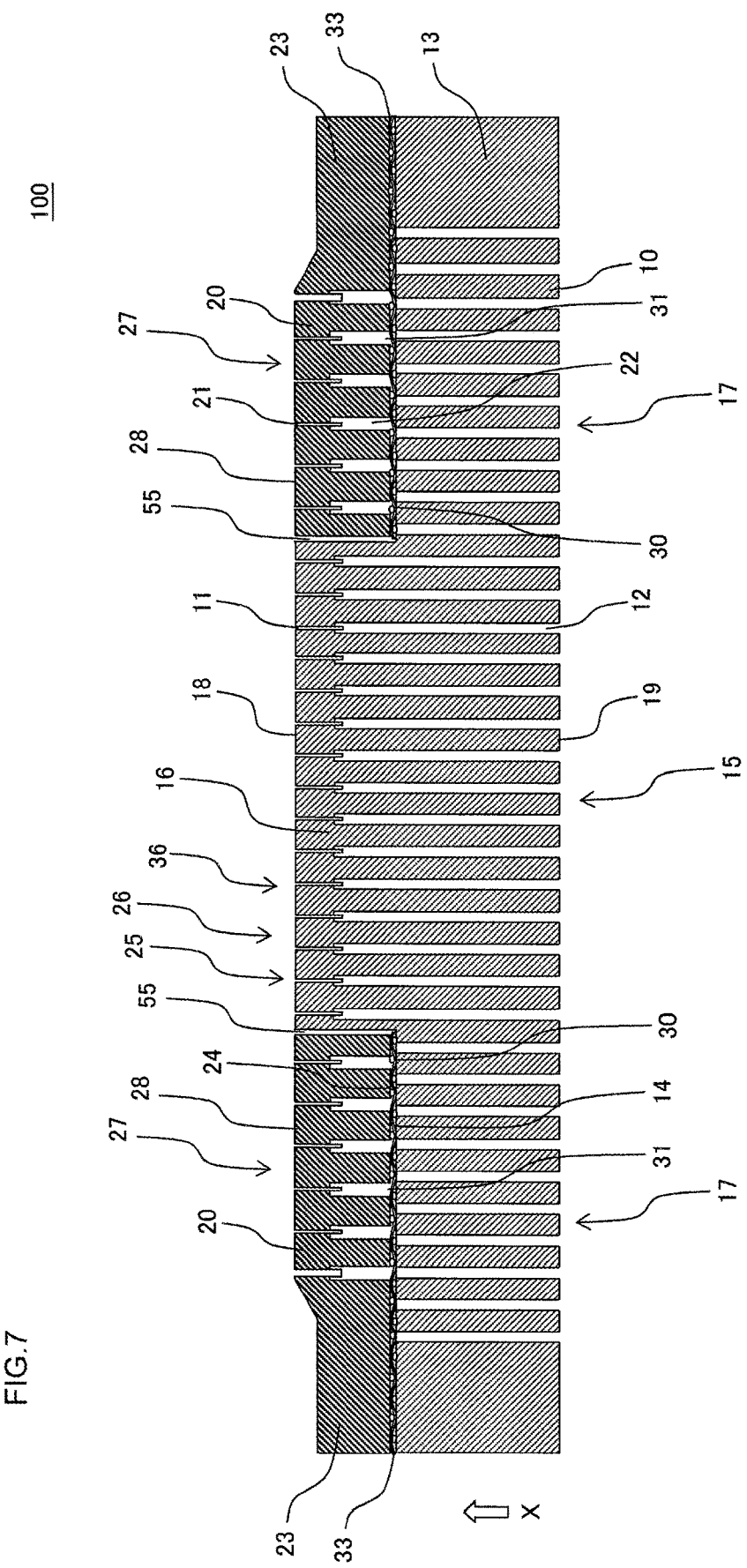
FIG. 7 is a cross-sectional view schematically showing a cross section taken along the A-A' line of the honeycomb structure forming die shown in FIG. 1.
Figure 8:
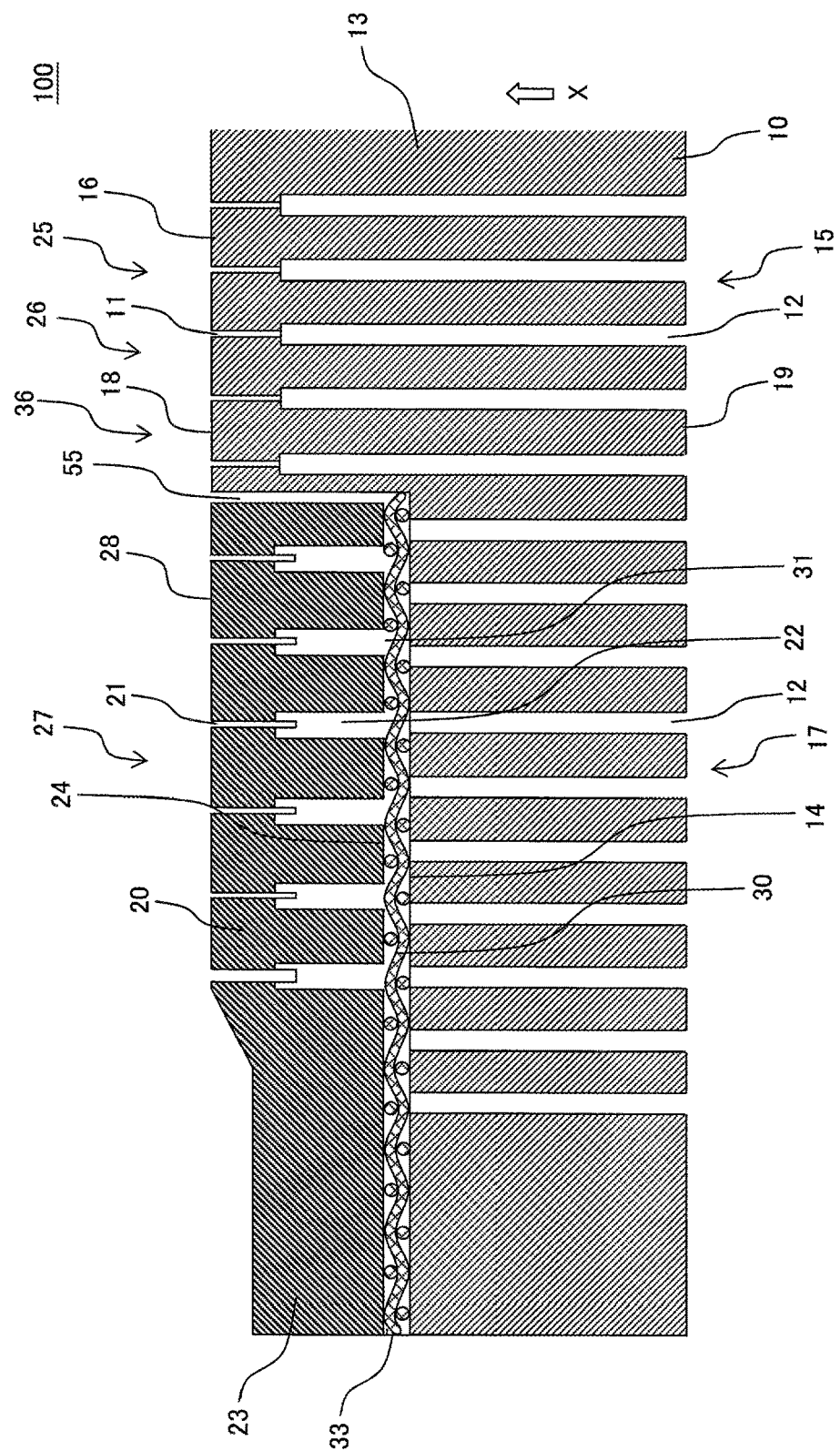
FIG. 8 is an enlarged cross-sectional view of an enlarged part of FIG. 7.

(1) Honeycomb Structure Forming Die:

One embodiment of a honeycomb structure forming die of the present invention will be described. Here, FIG. 1 is a plan view schematically showing a kneaded material discharging surface side of the one embodiment of the honeycomb structure forming die of the present invention. FIG. 2 is a plan view of a kneaded material introducing surface side of the honeycomb structure forming die shown in FIG. 1. FIG. 3 is a plan view of a kneaded material discharging surface side of a first die constituting the honeycomb structure forming die shown in FIG. 1. FIG. 4 is a plan view of a kneaded material discharging surface side of a second die constituting the honeycomb structure forming die shown in FIG. 1. FIG. 5 is a plan view of a kneaded material introducing surface side of the second die constituting the honeycomb structure forming die shown in FIG. 1. FIG. 6 is a plan view of a reticulated member constituting the honeycomb structure forming die shown in FIG. 1. FIG. 7 is a cross-sectional view schematically showing a cross section taken along the A-A' line of the honeycomb structure forming die shown in FIG. 1. FIG. 8 is an enlarged cross-sectional view of an enlarged part of FIG. 7. It is to be noted that in FIG. 3, FIG. 5 and FIG. 6, surfaces of the first die, the second die and the reticulated member are shown with hatchings, respectively.

As shown in FIG. 1 to FIG. 8, a honeycomb structure forming die 100 of the present embodiment includes a first die 10, a second die 20, and a reticulated member 30. The first die 10 is disposed on an upstream side in an extruding direction X of a kneaded material of a forming raw material, and a central region 15 on the side of a kneaded material discharging surface 18 has a convex region 16 projecting toward a downstream side in the extruding direction. The second die 20 is a ring-shaped die which is disposed on the downstream side of the first die 10 and which possesses a shape complementary to the convex region 16 of the first die 10. The reticulated member 30 is interposed between the first die 10 and the second die 20. The reticulated member 30 functions as a spacer to form a space between the surface (a downstream surface 14) of a circumferential region 17 of the first die 10 on the downstream side and the surface (an upstream surface 24) of the second die 20 on an upstream side. Hereinafter, the honeycomb structure forming die 100 of the present embodiment will be referred to simply as "the die 100" sometimes. The extruding direction X of the kneaded material is an extruding direction in performing extrusion by use of the die 100 of the present embodiment, and the direction extends from a kneaded material introducing surface 19 toward the kneaded material discharging surface 18.

According to the die 100 of the present embodiment, in the central region 15 of the first die 10, first kneaded material introducing holes 12 and latticed first slits 11 communicating with the first kneaded material introducing holes 12 are formed. The first kneaded material introducing holes 12 are formed coaxially with intersection points of the latticed first slits 11 in the extruding direction X. In other words, the first kneaded material introducing holes 12 communicate with the intersection points of the latticed first slits 11. In the circumferential region 17 surrounding the central region 15 of the first die 10, the first kneaded material introducing holes 12 are formed to pass through the circumferential region 17 of the first die 10.

In the ring-shaped second die 20, there are formed second kneaded material introducing holes 22 into which the kneaded material discharged from the first kneaded material introducing holes 12 formed in the circumferential region 17 of the first die 10 is introduced, and latticed second slits 21 communicating with the second kneaded material introducing holes 22. The second kneaded material introducing holes 22 are formed coaxially with intersection points of the latticed second slits 21 in the extruding direction X. In other words, the second kneaded material introducing holes 22 communicate with the intersection points of the latticed second slits 21. The die 100 of the present embodiment is constituted so that opening positions of the first kneaded material introducing holes 12 of the circumferential region 17 of the first die 10 do not match opening positions of the second kneaded material introducing holes 22 of the second die 20 in at least a part of the die.

In the die 100 of the present embodiment, the first die 10 and the second die 20 are combined to sandwich the reticulated member 30 therebetween. Hereinafter, an end face of the circumferential region 17 of the first die 10 on the downstream side in the extruding direction X will be referred to as "the downstream surface 14 in the circumferential region 17 of the first die 10" and an end face of the ring-shaped second die 20 on the upstream side in the extruding direction X will be referred to as "the upstream surface 24 of the second die 20" sometimes. Furthermore, when the upstream side is simply mentioned, the upstream side in the extruding direction X is meant, and when the downstream side is simply mentioned, the downstream side in the extruding direction X is meant.

The die 100 of the present embodiment has through channels 31 which are formed by meshes of the reticulated member 30 and through which the kneaded material moves between the first kneaded material introducing hole 12 and the second kneaded material introducing hole 22, between the downstream surface 14 in the circumferential region 17 of the first die 10 and the upstream surface 24 of the second die 20. In FIG. 6 to FIG. 8, reference numeral 33 indicates a linear material 33 constituting the reticulated member 30. As shown in FIG. 6, a central region of the reticulated member 30 has a cavity region 36 obtained by hollowing out a region corresponding to the convex region 16 of the first die 10 in a round shape.

The die 100 of the present embodiment has a clearance region 55 to extrude the kneaded material into a ring shape, between an outer peripheral surface of the convex region 16 of the first die 10 and an inner peripheral surface of the ring-shaped second die 20. In other words, according to the die 100 of the present embodiment, a cavity region 26 in a central region 25 of the second die 20 is formed to be slightly larger than a peripheral edge of the convex region 16 of the first die 10. According to this constitution, when the first die is combined with the second die to insert the convex region 16 of the first die 10 into the cavity region 26 of the ring-shaped second die 20, the ring-shaped clearance region 55 is formed between the convex region 16 of the first die 10 and the second die 20. The ring-shaped clearance region 55 functions as the clearance region 55 to form a boundary wall of a honeycomb formed body. In the present invention, "the ring-shaped second die 20 possessing a shape complementary to the convex region 16 of the first die 10" means a ring-shaped die having the cavity region 26 which is slightly larger than the convex region 16 of the first die 10.

In the die 100 of the present embodiment, an end face of the first die 10 on the upstream side in the extruding direction X is the kneaded material introducing surface 19 of the whole die 100. Therefore, during extrusion, the kneaded material of the forming raw material is initially introduced into the first kneaded material introducing holes 12 opened in the kneaded material introducing surface 19 of the first die 10. The kneaded material introduced into the first kneaded material introducing holes 12 of the central region 15 of the first die 10 moves to the latticed first slits 11 communicating with the first kneaded material introducing holes 12, and is discharged as a formed body corresponding to a shape of the first slits 11 from the kneaded material discharging surface 18 of the first die. On the other hand, the kneaded material introduced into the first kneaded material introducing holes 12 of the circumferential region 17 of the first die 10 is discharged from a downstream surface 14 side of the first die 10, and introduced into the second kneaded material introducing holes 22 of the second die 20 through the meshes of the reticulated member 30. Consequently, even when positions of the first kneaded material introducing holes 12 of the first die 10 do not match those of the second kneaded material introducing holes 22 of the second die 20, the movement of the kneaded material is suitably performed between the first kneaded material introducing hole 12 and the second kneaded material introducing hole 22. The reticulated member 30 is formed, for example, by intertwining the linear materials 33 extending in a lateral direction with the linear materials 33 extending in a vertical direction, and hence in a region other than a region where the intertwined linear materials 33 are superimposed on each other, the movement of the kneaded material is also performed among the meshes of the reticulated member 30. Consequently, when the kneaded material moves through the meshes of the reticulated member 30, it is possible to uniformize a flow rate distribution of the kneaded material to be introduced into the second kneaded material introducing holes 22. The kneaded material introduced into the second kneaded material introducing holes 22 of the second die 20 moves to the latticed second slits 21 communicating with the second kneaded material introducing holes 22, and is discharged as a formed body corresponding to a shape of the second slits 21 from a kneaded material discharging surface 28 of the second die. Therefore, the die 100 of the present embodiment is capable of uniformizing an amount of the kneaded material to be discharged from the second slits 21 of the second die 20 and forming the honeycomb formed body in a high quality. Furthermore, the through channels 31 formed by the meshes of the reticulated member 30 also communicate with the clearance region 55 to extrude the kneaded material into the ring shape, and hence the kneaded material introduced into the first kneaded material introducing holes 12 of the circumferential region 17 of the first die 10 is also introduced into the clearance region 55 through the meshes of the reticulated member 30. Therefore, it is also possible to uniformize a flow rate distribution of the kneaded material to be introduced into the clearance region 55, and it is also possible to especially effectively inhibit generation of formation defects around the boundary wall of the honeycomb formed body to be extruded. Consequently, the die 100 of the present embodiment is capable of forming, in a high quality, the honeycomb formed body having a central portion different from a circumferential portion in cell structure and having the boundary wall in a boundary between the central portion and the circumferential portion.

In the present description, "the cell structure" means a structure of a honeycomb structure which is directed in accordance with a partition wall thickness, a cell density, and a cell shape. Furthermore, "the shape of the slits" means the shape of the slits which is directed in accordance with a width, a depth and a length of each slit formed in the die and a mutually connecting configuration of the slits.

Furthermore, when a space is to be disposed between the first die 10 and the second die 20 without interposing the reticulated member 30 between the first die 10 and the second die 20, the second die 20 is brought into a cantilever-like state. Thus, when the second die 20 comes in the cantilever-like state and when a back pressure is generated in the die 100 at a time of die replacement or at the stop of ram molding, the second die 20 might be deformed. In the die 100 of the present embodiment, the reticulated member 30 is interposed between the first die 10 and the second die 20, and hence the back pressure generated in the second die 20 can be received by the reticulated member 30 to disperse the back pressure.

Furthermore, although not shown in the drawings, according to the die of the present embodiment, a plurality of types of second dies which are different in shape of the second slits may separately be prepared, and the second die is replaceable for use in accordance with the cell structure of the honeycomb formed body to be formed. The second kneaded material introducing holes of the second die are formed coaxially with the intersection points of the latticed second slits in the extruding direction, and hence the respective opening positions of the second kneaded material introducing holes in the upstream surface of the second die vary in accordance with the shape of the second slits of the second die. Even when the second die having a different shape of the second slits is used, uniform extrusion can always be achieved in the central region and circumferential region without obstructing the movement of the kneaded material in the die, because the reticulated member is interposed between the first die and the second die.

Figure 9:
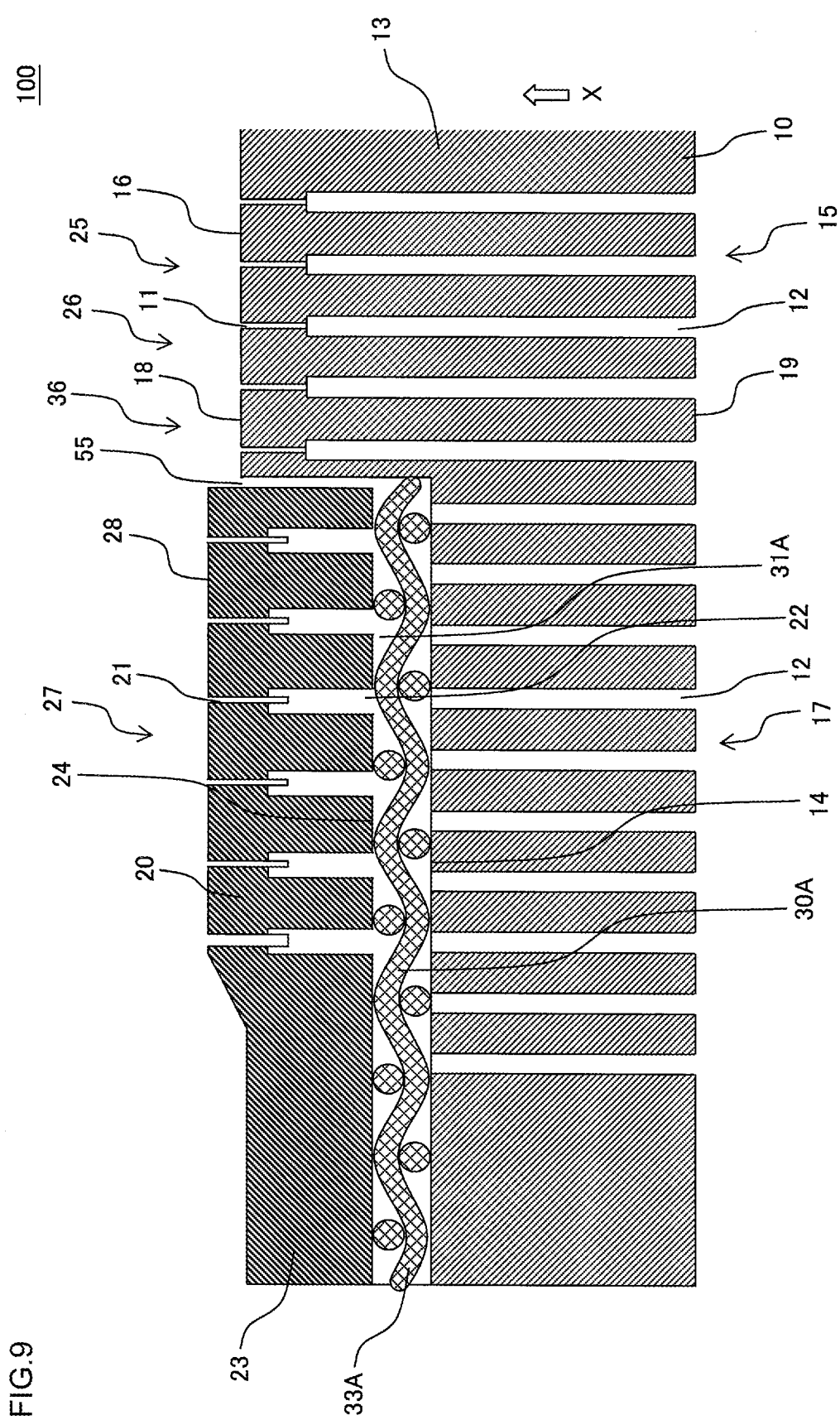
FIG. 9 is an enlarged cross-sectional view showing a state where the reticulated member is replaced in the honeycomb structure forming die shown in FIG. 8.

Further in the die 100 of the present embodiment, the reticulated member 30 is a member separated from the first die 10 and the second die 20, and hence when the reticulated member 30 is replaced, a thickness of the reticulated member 30, a size of the meshes or the like is easily changeable. For example, when the thickness of the reticulated member 30 in the extruding direction X is changed, a distance between the first die 10 and the second die 20 in the extruding direction X is adjustable. Then, the above-mentioned distance in the extruding direction X is adjusted, whereby an amount of the kneaded material to be introduced into the clearance region 55 is adjustable. For example, the distance between the first die 10 and the second die 20 in the extruding direction X is adjustable by using a reticulated member 30A shown in FIG. 9. The reticulated member 30A shown in FIG. 9 is the reticulated member 30A formed by using a linear material 33A having a larger diameter than the linear material 33 of the reticulated member 30 shown in FIG. 8. Here, FIG. 9 is an enlarged cross-sectional view showing a state where the reticulated member is replaced in the honeycomb structure forming die shown in FIG. 8. In the die 100 shown in FIG. 9, constituent elements constituted similarly to the die 100 shown in FIG. 8 are denoted with the same reference numerals as in FIG. 8, and description is omitted sometimes. In FIG. 9, reference numeral 31A indicates through channels formed by meshes of the reticulated member 30A.

For example, when a type of kneaded material of the forming raw material is changed during use of the die 100 shown in FIG. 8, fluidity of the kneaded material varies, and the flow rate distribution of the kneaded material to be introduced into the clearance region 55 might vary. Consequently, when the type of kneaded material is changed, balance in consumption of kneaded material between the second slits 21 and the clearance region 55 might be lost. Furthermore, also when the second die 20 is replaced with another second die (not shown) having a different shape of second slits, the amount of the kneaded material to be discharged from the second slits 21 of the second die 20 varies, and the balance in consumption of the kneaded material between the second slits 21 and the clearance region 55 might be lost. When the balance in consumption of the kneaded material between the second slits 21 and the clearance region 55 is lost, the thickness of the reticulated member 30 is adjusted, and the amount of the kneaded material to be introduced into the clearance region 55 is adjusted, whereby it is possible to effectively inhibit the generation of the formation defects around the boundary wall of the honeycomb formed body. Furthermore, besides the adjustment of the thickness of the reticulated member 30, for example, also by adjustment of the size of the meshes of the reticulated member 30, the amount of the kneaded material to be introduced into the clearance region 55 is adjustable. In the die 100 of the present embodiment, also when the change of the type of kneaded material, the replacement of the second die and the like are performed, the thickness of the reticulated member 30 or the size of the meshes is adjusted, whereby the flow rate distribution of the kneaded material in the die 100 is suitably adjustable. Therefore, the die 100 of the present embodiment produces not only the effect that the second die is replaceable but also the especially remarkable effect that the die is remarkably excellent in versatility.

Figure 10:
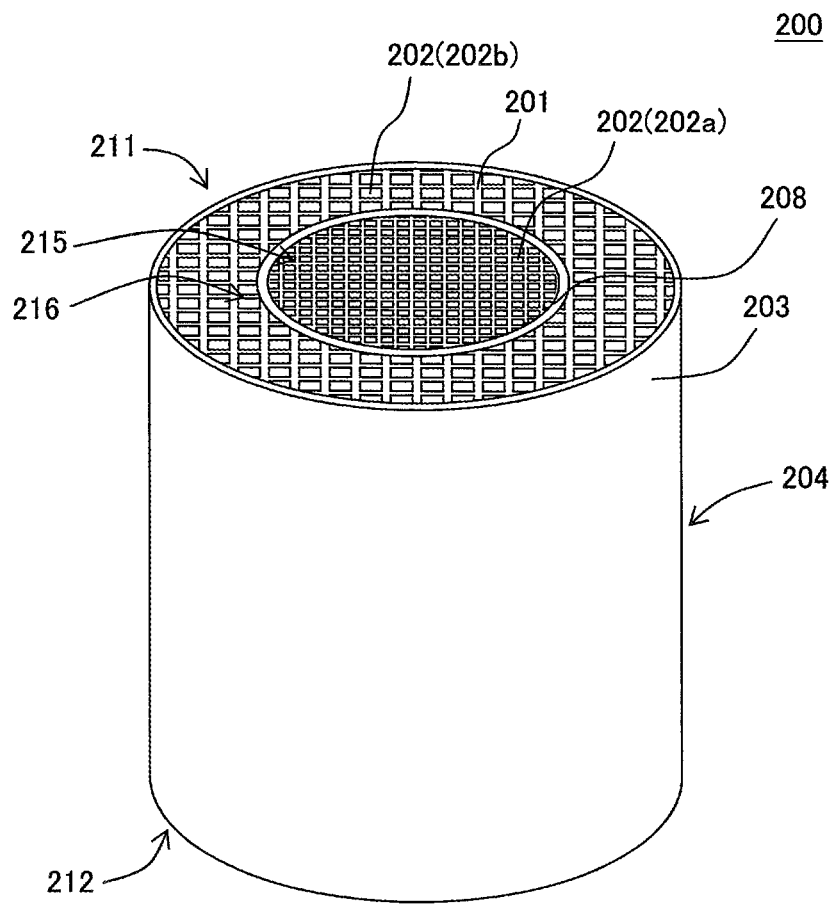
FIG. 10 is a perspective view schematically showing one example of a honeycomb structure prepared by the honeycomb structure forming die of the present invention.
Figure 11:
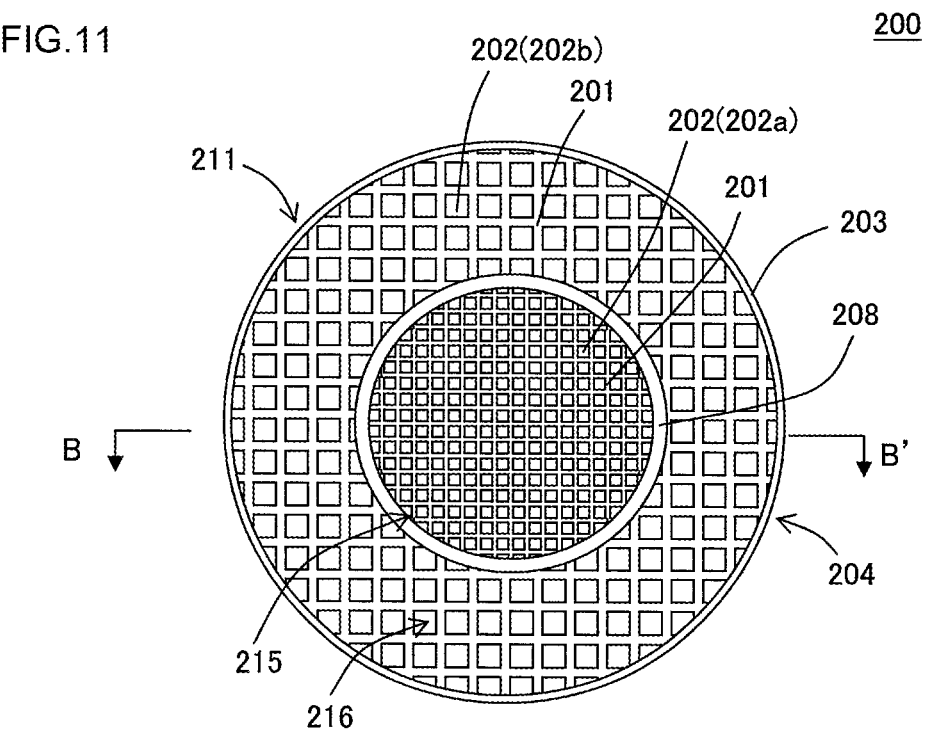
FIG. 11 is a plan view schematically showing an inflow end face of the honeycomb structure shown in FIG. 10.
Figure 12:
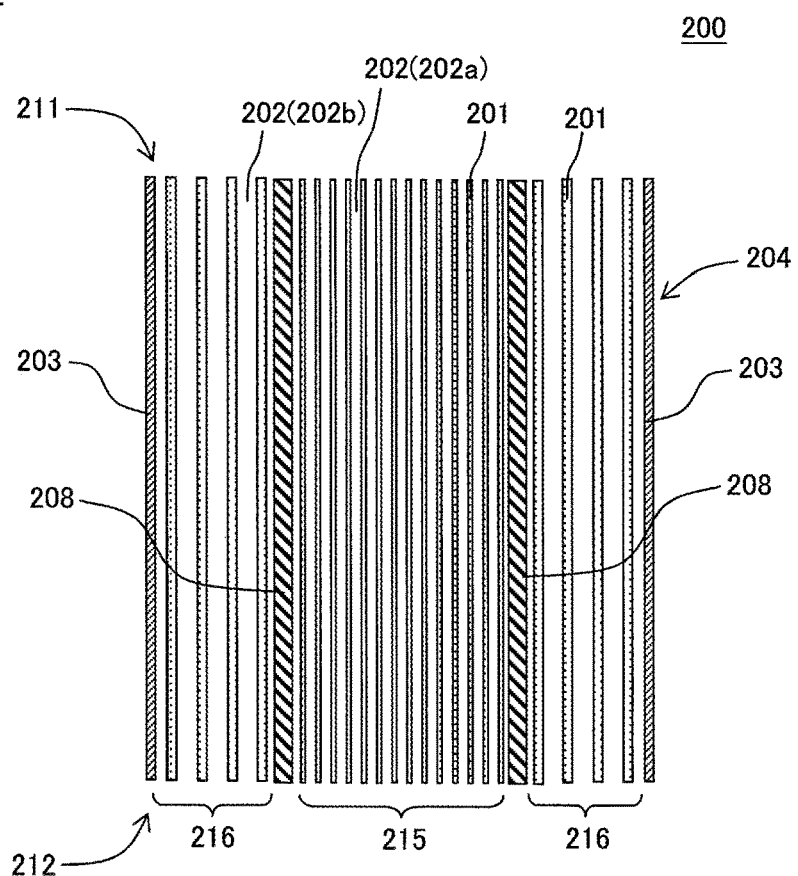
FIG. 12 is a cross-sectional view schematically showing a cross section taken along the B-B' line of FIG. 11.

Here, the honeycomb structure prepared by the honeycomb structure forming die of the present embodiment is described. FIG. 10 is a perspective view schematically showing one example of the honeycomb structure prepared by the honeycomb structure forming die of the present invention. FIG. 11 is a plan view schematically showing an inflow end face of the honeycomb structure shown in FIG. 10. FIG. 12 is a cross-sectional view schematically showing a cross section taken along the B-B' line of FIG. 11.

A honeycomb structure 200 shown in FIG. 10 to FIG. 12 includes a pillar-shaped honeycomb structure body 204 having porous partition walls 201 and a circumferential wall 203 disposed to surround a circumference of the partition walls 201. The partition walls 201 of the honeycomb structure body 204 define a plurality of cells 202 which extend from an inflow end face 211 to an outflow end face 212 and become through channels for a fluid. Furthermore, the honeycomb structure body 204 has a central cell structure 215, a circumferential cell structure 216, and a boundary wall 208 disposed in a boundary portion between the circumferential cell structure 216 and the central cell structure 215. In the honeycomb structure body 204, the central cell structure 215 and the circumferential cell structure 216 are different cell structures.

Here, the central cell structure 215 is a cell structure constituted by a plurality of cells 202a formed in a central portion of the honeycomb structure body 204 in a plane of the honeycomb structure body 204 which is perpendicular to an extending direction of the cells 202. The circumferential cell structure 216 is a cell structure constituted by a plurality of cells 202b formed closer to a circumference of the honeycomb structure body 204 than to the central portion of the honeycomb structure body in the above plane.

"The cell structure" is a structure formed by a set of repeating units, and one repeating unit corresponds to one cell 202 defined by the partition walls 201 or a combination of a plurality of cells 202 in the plane perpendicular to the extending direction of the cells 202. For example, when the cells having the same shape are regularly arranged in the above plane, a region where the cells having the same shape are present becomes one cell structure. Furthermore, when a combination of a plurality of cells which are different in cell shape constitutes one repeating unit, a region where the repeating unit is present constitutes one cell structure.

When it is described that two cell structures are "different cell structures", it is meant that in case of comparison of the two cell structures, the structures are different in one of a partition wall thickness, a cell density and a cell shape. Here, when "the structures are different in partition wall thickness", it is meant that in case of the comparison of the partition wall thicknesses of the two cell structures, there is a difference of 25 μm or more. Furthermore, when "the structures are different in cell density", it is meant that in case of the comparison of the cell densities of the two cell structures, there is a difference of 7 cells/cm$^2$ or more.

The die of the present embodiment is suitably usable in formation of a honeycomb formed body to manufacture the honeycomb structure 200 shown in FIG. 10 to FIG. 12. Hereinafter, a more suitable configuration of the die of the present embodiment will be described.

In the die of the present embodiment, it is preferable that the shape of the first slits 11 is different from the shape of the second slits 21 as shown in FIG. 1 to FIG. 8. There are not any special restrictions on the shape of the first slits 11 and the shape of the second slits 21, and the shapes are suitably selectable in accordance with the cell structure of the honeycomb formed body to be formed. Furthermore, the die may include two or more types of second dies 20 which are different in shape of the second slits 21, and may be constituted so that the second die 20 is replaceable. Furthermore, the die may include two or more types of first dies 10 which are different in shape of the first slits 11, and may be constituted so that the first die 10 is replaceable.

An example of the reticulated member 30 is a reticulated member formed by intertwining a plurality of linear materials 33. However, the reticulated member 30 may only be meshed so that a thickness of a region where the meshes intersect with one another is large and so that another region is thinner than this intersecting region. Another example of the reticulated member 30 may be a meshed member constituted of a plurality of linear materials 33 monolithically formed in advance by molding or the like. It is to be noted that as a substitute for the reticulated member, there is usable a perforated member such as a punching plate including a plate-shaped member in which a plurality of holes are made. However, in this perforated member, the respective holes are separately formed, and hence it is difficult for the kneaded material to move among the plurality of holes. Consequently, the perforated member, e.g., the punching plate or the like has difficulty in obtaining the effect of uniformizing the flow rate distribution of the kneaded material, as compared with the reticulated member 30 of the die 100 of the present embodiment.

There is not any special restriction on a diameter of the linear material 33 constituting the reticulated member 30 and, for example, it is preferable that the diameter is from 0.030 to 0.500 mm. When the diameter of the linear material 33 is smaller than 0.030 mm, the thickness of the reticulated member 30 is excessively small, and it might be difficult to uniformize the flow rate distribution of the kneaded material. Furthermore, the linear material 33 might be thin and strength of the reticulated member 30 might deteriorate. When the diameter of the linear material 33 is in excess of 0.500 mm, the meshes are excessively large for the kneaded material introducing holes, a difference in flow velocity might therefore be made between the introducing holes, and formation properties unfavorably deteriorate. It is to be noted that the thickness of the reticulated member 30 is usually a value twice as large as the above-mentioned diameter of the linear material 33.

There is not any special restriction on the size of the meshes of the reticulated member 30. For example, it is preferable that the number of the meshes per centimeter is from 3.9 to 130. When the number of the meshes per centimeter is smaller than 3.9, the strength of the reticulated member 30 deteriorates, and the reticulated member 30 might be easy to deform. Especially, when the diameter of the linear material 33 is small, the reticulated member 30 is more remarkably deformed. On the other hand, when the number of the meshes per centimeter is in excess of 130, the meshes of the reticulated member 30 becomes excessively dense, and resistance during passage of the kneaded material might increase. Furthermore, as the number of the meshes per centimeter increases, the diameter of the usable linear material 33 is limited, and an upper limit of the thickness of the reticulated member 30 might be limited.

The die 100 of the present embodiment may include two or more reticulated members 30. For example, as shown in FIG. 8 and FIG. 9, two or more reticulated members 30 and 30A which are different in thickness may beforehand be prepared. Furthermore, the reticulated member in which the distance between the first die 10 and the second die 20 in the extruding direction X is optimum may suitably be selected for use from the two or more reticulated members 30 and 30A in accordance with formation conditions during the extrusion. Furthermore, although not shown in the drawings, the two or more reticulated members may be different in the number of the meshes per centimeter, i.e., the size of the meshes.

A ratio of an area of the central region 15 of the first die 10 to an area of an end face of the honeycomb formed body to be extruded can suitably be determined in accordance with the cell structures of the central portion and circumferential portion of the honeycomb formed body to be formed (e.g., see FIG. 10 to FIG. 12). It is to be noted that in the die of the present embodiment, the above ratio is preferably from 30 to 70% and especially preferably from 40 to 60%.

As described above, in the die 100, the cavity region 26 in the central region 25 of the second die 20 is formed to be slightly larger than the peripheral edge of the convex region 16 of the first die 10, and the ring-shaped clearance region 55 is formed between the convex region 16 of the first die 10 and the second die 20. There is not any special restriction on an interval between the ring-shaped clearance regions 55 mentioned above, and the interval is suitably selectable in accordance with a thickness of the boundary wall of the honeycomb formed body to be formed. For example, it is preferable that the interval between the ring-shaped clearance regions 55 is from 0.04 to 0.50 mm.

In the first die 10, it is preferable that the central region 15 is the same as the circumferential region 17 in an opening diameter of the first kneaded material introducing hole 12 and an interval between the first kneaded material introducing holes 12. According to such a constitution, for example, it is possible to easily manufacture the first die 10 at low cost.

Figure 13:
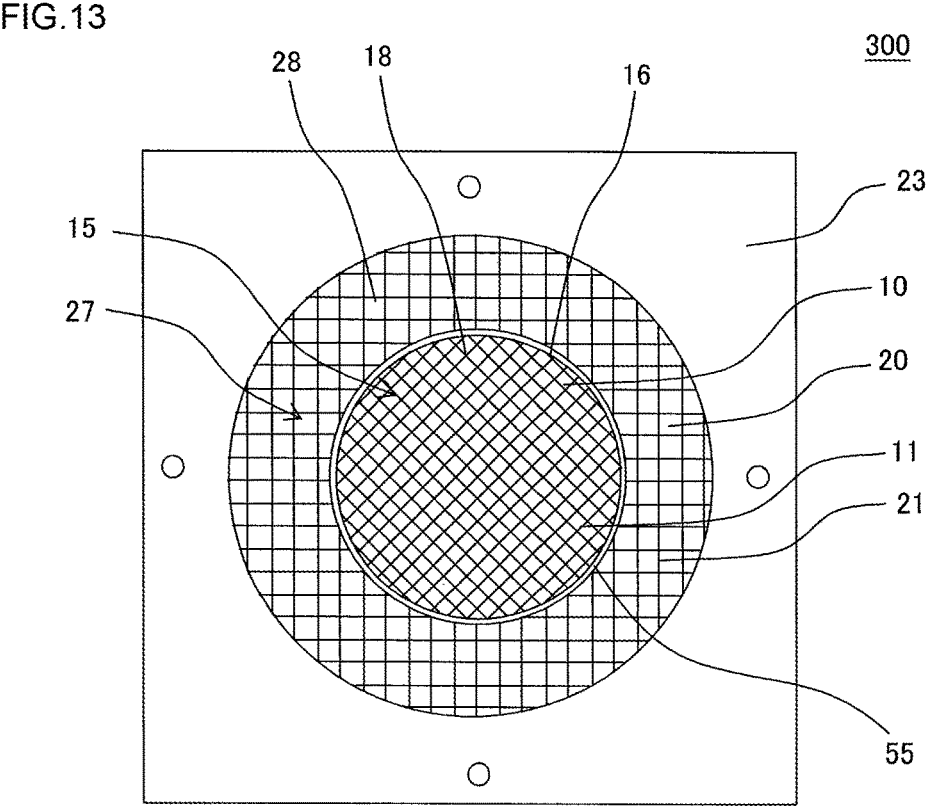
FIG. 13 is a plan view schematically showing a kneaded material discharging surface side of another embodiment of the honeycomb structure forming die of the present invention.

Furthermore, in the die of the present embodiment, slits surrounding one cell among the first slits and slits surrounding one cell among the second slits may extend in mutually intersecting directions. Here, "the cell" means a space defined by partition walls in the honeycomb formed body to be formed. For example, a die 300 shown in FIG. 13 is prepared in a state where the first slits 11 of the first die 10 are rotated clockwise as much as 45° from the die 100 shown in FIG. 1. Consequently, in the die 300, slits surrounding one cell among the first slits 11 and slits surrounding one cell among second slits 21 do not have a parallel positional relation. In the die of the present embodiment, even when the slits surrounding the respective cells intersect with one another in the first slits and the second slits as described above, it is possible to uniformize the flow rate distribution of the kneaded material. Therefore, it is possible to uniformize the amount of the kneaded material to be discharged from the second slits of the second die and it is possible to form the honeycomb formed body in a high quality.

In the die 100 of the present embodiment, as shown in FIG. 1, an arranging direction of the cell structure of the honeycomb formed body to be extruded through the first slits 11 is parallel to an arranging direction of the cell structure of the honeycomb formed body to be extruded through the second slits 21. In other words, an extending direction of the first slits 11 of the first die 10 is parallel to an extending direction of the second slits 21 of the second die 20. However, as in the die 300 shown in FIG. 13, the arranging direction of the cell structure of the honeycomb formed body to be extruded through the first slits 11 and the arranging direction of the cell structure of the honeycomb formed body to be extruded through the second slits 21 may extend in mutually intersecting directions. FIG. 13 is a plan view schematically showing a kneaded material discharging surface side of another embodiment of the honeycomb structure forming die of the present invention. In the die 300 shown in FIG. 13, constituent elements similar to those of the die 100 shown in FIG. 1 are denoted with the same reference numerals and description thereof is omitted sometimes.

The die 300 shown in FIG. 13 also includes a reticulated member 30 (see FIG. 8) between a first die 10 and a second die 20. Consequently, also when an extending direction of the first slits 11 of the first die 10 and an extending direction of the second slits 21 of the second die 20 intersect with each other as in the die 300 shown in FIG. 13, it is possible to uniformize the flow rate distribution of the kneaded material. Therefore, it is possible to uniformize an amount of the kneaded material to be discharged from the second slits 21 of the second die 20 and it is possible to form the honeycomb formed body in a high quality.

Furthermore, the die 300 shown in FIG. 13 is beforehand prepared so that the first slits 11 of the first die 10 are rotated clockwise as much as 45°. However, for example, the die 100 shown in FIG. 1 is usable by rotating the first die 10 clockwise as much as 45°. Also when the first die 10 of the die 100 shown in FIG. 1 is rotated clockwise as much as 45°, the movement of the kneaded material in the die 100 is not obstructed, because the reticulated member 30 is present between the first die 10 and the second die 20 as shown in FIG. 7 and FIG. 8. A conventional die which does not include the reticulated member 30 is designed so that, for example, the first kneaded material introducing holes of the first die match the second kneaded material introducing holes of the second die in the extruding direction of the kneaded material. Consequently, when the first die is only rotated for use, the movement of the kneaded material in the die might be obstructed.

In the die of the present embodiment shown in FIG. 1 to FIG. 8, there are not any special restrictions on a thickness of the first die 10, a projecting height of the convex region 16 of the first die 10 and a thickness of the second die 20. It is preferable that the thickness of the first die 10 is from 10 to 50 min. It is preferable that the projecting height of the convex region 16 of the first die 10 is from 10 to 30 mm. It is preferable that the thickness of the second die 20 is from 10 to 30 mm. It is to be noted that the projecting height of the convex region 16 of the first die 10 may be the same as or different from the thickness of the second die 20. For example, when the convex region 16 of the first die 10 is inserted into the cavity region 26 of the ring-shaped second die 20, a position of the kneaded material discharging surface 18 of the first die 10 may match or does not have to match a position of the kneaded material discharging surface 28 of the second die 20.

Figure 14:
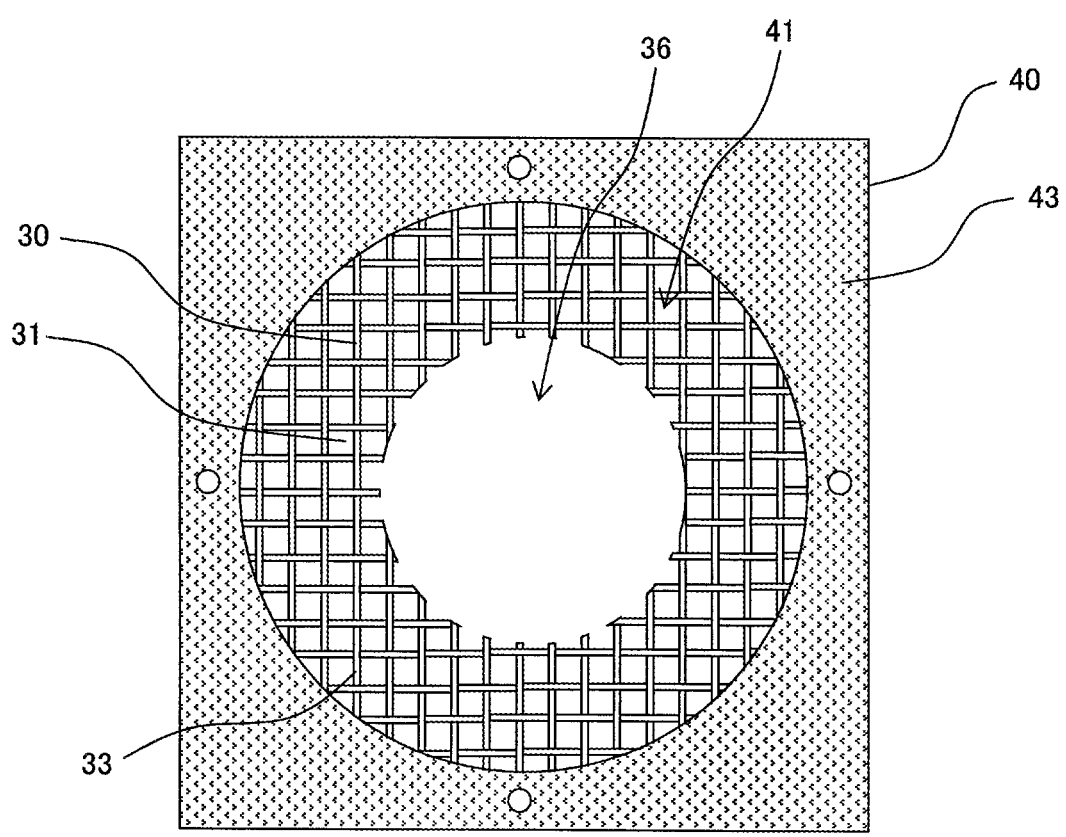
FIG. 14 is a plan view schematically showing a reticulated member and a space acquiring member for use in still another embodiment of the honeycomb structure forming die of the present invention.

Furthermore, the die of the present invention may further include a ring-shaped space acquiring member 40 as shown in FIG. 14. Here, FIG. 14 is a plan view schematically showing a reticulated member and the space acquiring member for use in still another embodiment of the honeycomb structure forming die of the present invention. In the space acquiring member 40, a central region of a substrate 43 is hollowed out into a round shape, to form a space 41 in a central region of the space acquiring member 40. The space acquiring member 40 is interposed for use between a first die 10 (see FIG. 8) and a second die 20 (see FIG. 8). Therefore, the space acquiring member 40 functions as a spacer to form a space between a surface (a downstream surface) in a circumferential region of the first die on a downstream side and a surface (an upstream surface) of the second die on an upstream side. In an inner region of the space acquiring member 40, i.e., the space 41 formed in the substrate 43, it is preferable that a reticulated member 30 hitherto described is disposed. The reticulated member 30 shown in FIG. 14 has, for example, a donut shape in which a circumferential region of the reticulated member 30 shown in FIG. 6 is adjusted into a round shape. In FIG. 14, the donut-shaped reticulated member 30 is received in the space 41 of the space acquiring member 40, and both the reticulated member 30 and the space acquiring member 40 are interposed between the first die 10 (see FIG. 8) and the second die 20 (see FIG. 8).

Thus, the honeycomb structure forming die further includes the space acquiring member 40 shown in FIG. 14, whereby during extrusion, it is possible to relax compressive stress to be applied to the reticulated member 30 and it is possible to effectively inhibit deformation or damages of the reticulated member 30. It is preferable that the reticulated member 30 shown in FIG. 14 is constituted similarly to the reticulated member 30 shown in FIG. 6 except that the reticulated member has the donut shape in which the circumferential region of the reticulated member 30 shown in FIG. 6 is adjusted into the round shape. In the reticulated member 30 shown in FIG. 14, constituent elements similar to those of the reticulated member 30 shown in FIG. 6 are denoted with the same reference numerals and description thereof is omitted.

An example of a material of a first die substrate 13 constituting the first die 10 and a second die substrate 23 constituting the second die 20 is a metal or an alloy which is usually used as a material of the honeycomb structure forming die. Hereinafter, the first die substrate and the second die substrate will generically be referred to simply as "the die substrate" sometimes. An example of the material of the die substrate is a metal or an alloy including at least one metal selected from the group consisting of iron (Fe), titanium (Ti), nickel (Ni), copper (Cu) and aluminum (Al).

An example of the alloy for use as the material of the die substrate is stainless alloy, more specifically SUS630. This stainless alloy is an inexpensive material which is comparatively easy to process. Another example of the alloy constituting the die substrate is tungsten carbide based cemented carbide which is excellent in wear resistance. By use of the die substrate made of tungsten carbide based cemented carbide or the like, it is possible to manufacture the honeycomb structure forming die in which the slits wear away less.

There is not any special restriction on a material of the reticulated member 30, but an example of the material is any type of metal or alloy.

There is not any special restriction on a method of manufacturing the die of the present embodiment. For example, the die of the present embodiment can be manufactured in conformity with a heretofore known die manufacturing method.

The first kneaded material introducing holes and the second kneaded material introducing holes can be forming by using known machine processing such as drill processing, discharge processing, electrolytic processing or laser processing to the first die substrate and the second die substrate.

The first slits and the second slits can be formed by using known machine processing such as grind processing, discharge processing, electrolytic processing or laser processing to the first die substrate and the second die substrate.

The convex region constituting the central region of the first die can be formed by grind processing, discharge processing, or bonding of two members.

The reticulated member can be manufactured, for example, by preparing a wire netting prepared by intertwining a plurality of linear materials, and making a hole having a size corresponding to that of the convex region of the first die in a central region of the prepared wire netting.

EXAMPLES

Hereinafter, the present invention will further specifically be described with reference to examples, but the present invention is not restricted by these examples.

Example 1

In Example 1, a die was manufactured to prepare a honeycomb structure 200 including a honeycomb structure body 204 having a central cell structure 215 different from a circumferential cell structure 216 in cell structure as shown in FIG. 10 to FIG. 12. More specifically, in Example 1, the die was prepared so that the honeycomb structure of a final product was constituted as follows. The honeycomb structure of the final product had a round pillar shape in which a diameter of each end face was 100 mm, and a diameter of the central cell structure in the end face was 70 mm. The honeycomb structure had a boundary wall having a thickness of 0.1 mm in a boundary between the central cell structure and the circumferential cell structure. In the central cell structure, a cell shape was quadrangular, a partition wall thickness was 0.09 mm, and a cell density was 93 cells/cm$^2$. In the circumferential cell structure, a cell shape was quadrangular, a partition wall thickness was 0.11 mm, and a cell density was 62 cells/cm$^2$. It is to be noted that each dimension of the above honeycomb structure does not include any manufacturing tolerances.

Initially in Example 1, there was prepared a plate-shaped first die substrate in which a vertical dimension was 200 mm, a lateral dimension was 200 mm and a thickness was 20 mm. The die substrate was made of stainless steel. One surface of the prepared first die substrate was defined as a kneaded material discharging surface, and in a central region on the side of the kneaded material discharging surface, a convex region was formed by discharge processing so that a projecting length was 10 mm.

Next, in the kneaded material discharging surface of the convex region of the first die substrate, latticed first slits were formed. The latticed first slits were formed into a slit shape to extrude partition walls constituting the central cell structure of the above-mentioned honeycomb structure of the final product. The first slits were formed by grind processing.

Next, in a kneaded material introducing surface of the first die substrate, first kneaded material introducing holes having an opening diameter of 1.2 mm were formed to communicate with intersection points of the first slits. Also in a circumferential region of the first die substrate which did not have a convex region, the first kneaded material introducing holes were formed at the same pitch as in a central region having the convex region. The first kneaded material introducing holes of the circumferential region of the first die substrate were through-holes extending from a kneaded material introducing surface of the first die substrate to a downstream surface of the circumferential region. As described above, a first die in the die of Example 1 was prepared.

Next, there was prepared a plate-shaped second die substrate in which a vertical dimension was 200 mm, a lateral dimension was 200 mm and a thickness was 10 mm. The die substrate was made of stainless steel. A central region of the prepared second die substrate was hollowed out into a round shape to form the second die substrate into a ring shape.

Next, in a kneaded material discharging surface of a convex region of the second die substrate, latticed second slits were formed. The latticed second slits were formed into a slit shape to extrude partition walls constituting the circumferential cell structure of the above-mentioned honeycomb structure of the final product. The second slits were formed by grind processing.

Next, in the surface of the second die substrate opposite to the kneaded material discharging surface, second kneaded material introducing holes having an opening diameter of 1.2 mm were formed to communicate with intersection points of the second slits.

Next, a wire netting was prepared by intertwining linear materials having a diameter of 0.2 mm so that the number of meshes per centimeter was seven. The wire netting was made of stainless steel. A central region of the prepared wire netting was hollowed out into a round shape having a diameter of 80 mm, to prepare a reticulated member having a space in a region corresponding to a central region of the first die.

Next, in a state where the reticulated member was disposed on the side of the kneaded material discharging surface on an outer side of a circumferential region of the first die, a convex region of a central region of the first die was inserted into a cavity region of a central region of a second die to sandwich the reticulated member between the first die and the second die, and thus, the die of Example 1 was manufactured.

Table 1 shows "a die structure", "a pitch (mm) of second slits", and "an interval (mm) between boundary portion forming clearance regions". Table 1 also shows "presence" of the reticulated member, "a diameter (mm) of the linear material" constituting the reticulated member, and "the number of the meshes per centimeter (meshes)" of the reticulated member. It is to be noted that the table shows a die as "two-body assembly" in a column of "the die structure" when the die is manufactured by combining the first die and the second die into one die to sandwich the reticulated member therebetween as in the die of Example 1. On the other hand, the table shows a die as "a monolithic structure" in the column of "the die structure" when the die is manufactured by preparing one die substrate so that a central region is different from a circumferential region in shape of slits.

A total operation time required in manufacturing the die of Example 1 was 70 hours. "A formed body quality" and "presence of deformation of the second die" were evaluated by using the die of Example 1 by such a method as described below. Table 1 shows the results.

(Formed Body Quality)

A honeycomb structure constituted of a cordierite composition was extruded by using the prepared die. The extruded honeycomb structure was visually confirmed, and the quality of the honeycomb structure was evaluated in accordance with the following evaluation standards. When there are not any appearance defects, a formed body is evaluated as "good". When there is the appearance defect or formation cannot be performed, the formed body is evaluated as "failure". Here, "the appearance defect" indicates that partition walls constituting the honeycomb structure bend due to extrusion rate deviations in respective regions of the die.

(Presence of Deformation of Second Die)

By use of the prepared die, extrusion was performed three times on the same conditions as in the evaluation of the formed body quality, and in a stage where the extrusions ended, presence of deformation of the second die was visually confirmed. When the deformation is confirmed in the second die, the table shows "present" in a corresponding column, and when any deformations are not confirmed in the second die, the table shows "none" in the corresponding column.

TABLE 1

| | Die structure | Pitch of second slits (mm) | Interval between boundary wall forming clearance regions (mm) | Reticulated member Presence | Reticulated member Diameter of linear material (mm) | Reticulated member No. of meshes per cm (meshes) | Total operation time required in manufacturing (hours) | Formed body quality | Presence of deformation of second die |
|---|---|---|---|---|---|---|---|---|---|
| Example 1 | Two-body assembly | 1.4 | 0.1 | Present | 0.1 | 7 | 70 | Good | None |
| Example 2 | Two-body assembly | 1.4 | 0.1 | Present | 0.2 | 7 | 70 | Good | None |
| Example 3 | Two-body assembly | 1.4 | 0.1 | Present | 0.1 | 12 | 70 | Good | None |
| Comparative Example 1 | Monolithic structure | 1.4 | 0.1 | — | — | — | 100 | Failure | None |
| Comparative Example 2 | Two-body assembly | 1.4 | 0.1 | None | — | — | 70 | Failure | None |
| Comparative Example 3 | Two-body assembly | 1.4 | 0.1 | None (space is present) | — | — | 80 | Good | Present |

Examples 2 and 3

The procedure of Example 1 was repeated except that "a diameter (mm) of a linear material" of a reticulated member and "the number of the meshes per centimeter (meshes)" were changed to such values as shown in Table 1, to manufacture dies. The procedure of Example 1 was repeated to perform evaluations of "formed body quality" and "presence of deformation of a second die" by use of the dies of Examples 2 and 3. Table 1 shows the results.

Comparative Example 1

In Comparative Example 1, there was prepared a plate-shaped die substrate in which a vertical dimension was 200 mm, a lateral dimension was 200 mm and a thickness was 20 mm. The die substrate was made of stainless steel. One surface of the prepared die substrate was defined as a kneaded material discharging surface, and in a central region on the side of the kneaded material discharging surface, slits having the same shape as in first slits of a die of Example 1 were formed. Next, in a circumferential region on the side of the kneaded material discharging surface of the die substrate, slits having the same shape as in second slits of the die of Example 1 were formed. Next, at a position corresponding to a clearance region of Example 1, a ring-shaped slit was formed to connect an end of each first slit to an end of each second slit. Next, from the side of a kneaded material introducing surface of the die substrate, kneaded material introducing holes having an opening diameter of 1.2 mm were formed to communicate with intersection points of the respective slits. As described above, a die of Comparative Example 1 was manufactured.

A total operation time required in manufacturing the die of Comparative Example 1 was 100 hours. The procedure of Example 1 was repeated to perform evaluations of "formed body quality" and "presence of deformation of a second die" by use of the die of Comparative Example 1. Table 1 shows the results.

Comparative Example 2

In Comparative Example 2, there were initially prepared a first die and a second die constituted in the same manner as in the first die and the second die of the die of Example 1. Next, in Comparative Example 2, the second die was combined with the first die to insert a convex region of a central region of the first die into a cavity region of a central region of the prepared second die, and thus, a die of Comparative Example 2 was manufactured. In other words, according to Comparative Example 2, the die was prepared without interposing a reticulated member between the first die and the second die.

A total operation time required in manufacturing the die of Comparative Example 2 was 70 hours. The procedure of Example 1 was repeated to perform evaluations of "formed body quality" and "presence of deformation of a second die" by use of the die of Comparative Example 2. Table 1 shows the results.

Comparative Example 3

In Comparative Example 3, there was initially prepared a first die constituted in the same manner as in the first die of the die of Example 1. Next, in Comparative Example 3, a second die was prepared in which a region of 0.1 mm from an upstream surface of a second die substrate in an extruding direction was removed by grind processing. The second die was combined with the first die to insert a convex region of a central region of the first die into a cavity region of a central region of the second die, and thus, a die of Comparative Example 3 was manufactured. In the die of Comparative Example 3, a downstream surface of a circumferential region of the first die did not abut on an upstream surface of the second die, and the second die in a cantilever-like state was combined with the first die.

A total operation time required in manufacturing the die of Comparative Example 3 was 80 hours. The procedure of Example 1 was repeated to perform evaluations of "formed body quality" and "presence of deformation of a second die" by use of the die of Comparative Example 3. Table 1 shows the results.

(Results)

In the dies of Examples 1 to 3, it was possible to shorten the manufacturing time and evaluations of the formed body qualities were suitable, as compared with the die of Comparative Example 1. Furthermore, in the dies of Examples 1 to 3, the deformation of the second die was not confirmed.

The die of Comparative Example 1 had a result of failure in the evaluation of the formed body quality. The reasons for this result are supposedly that when the central region of the die is different from the circumferential region thereof in shape of slits, a flow rate distribution of the kneaded material in the die easily becomes non-uniform, and an amount of the kneaded material to be discharged from the slits does not become uniform. Especially when extrusion was performed by using the die of Comparative Example 1, requirements exceeded supply of the kneaded material to form the boundary wall, and a lot of formation defects were confirmed in the boundary wall and its vicinity.

As to the die of Comparative Example 2, in a region where positions of first kneaded material introducing holes of the first die did not match those of second kneaded material introducing holes of the second die, movement of the kneaded material was obstructed, and a result of failure was only obtained in the evaluation of the formed body quality. Furthermore, when extrusion was performed by using the die of Comparative Example 2, requirements exceeded supply of the kneaded material to form the boundary wall, and formation defects were remarkably confirmed in the boundary wall and its vicinity.

In the die of Comparative Example 3, the evaluation of the formed body quality was suitable, but in the evaluation of the presence of the deformation of the second die, the deformation of the second die was confirmed. When the second die is remarkably deformed, the formed body quality might be influenced. Furthermore, when the second die is easy to deform, there is the fear that manufacturing cost of a product increases due to replacement of the die, or the like.

A honeycomb structure forming die of the present invention is utilizable in manufacturing a honeycomb formed body having a central portion different from a circumferential portion in cell structure.

DESCRIPTION OF REFERENCE NUMERALS

10: first die, 11: first slit, 12: first kneaded material introducing hole, 13: first die substrate, 14: downstream surface (the downstream surface of a circumferential region of the first die), 15: central region, 16: convex region, 17: circumferential region, 18: kneaded material discharging surface (the kneaded material discharging surface of the first die), 19: kneaded material introducing surface, 20: second die, 21: second slit, 22: second kneaded material introducing hole, 23: second die substrate, 24: upstream surface (the upstream surface of the second die), 25: central region, 26: cavity region, 27: circumferential region, 28: kneaded material discharging surface (the kneaded material discharging surface of the second die), 30 and 30A: reticulated member, 31 and 31A: through channel, 33 and 33A: linear material, 36: cavity region, 40: space acquiring member, 41: space, 43: substrate, 55: clearance region (a boundary wall forming clearance region), 100 and 300: honeycomb structure forming die (the die), 201: partition wall, 202: cell, 202a: cell (cells of a central cell structure), 202b: cell (cells of a circumferential cell structure), 203: circumferential wall, 204: honeycomb structure body, 208: boundary wall, 211: inflow end face, 212: outflow end face, 215: central cell structure, 216: circumferential cell structure, 200: honeycomb structure, and X: extruding direction.

What is claimed is:

1. A honeycomb structure forming die comprising:

a first die which is disposed on an upstream side in an extruding direction of a kneaded material of a forming raw material and in which a central region on the side of a kneaded material discharging surface has a convex region projecting toward a downstream side in the extruding direction; and a ring-shaped second die which is disposed on the downstream side of the first die and which possesses a shape complementary to the convex region, wherein in the central region of the first die, first kneaded material introducing holes and latticed first slits communicating with the first kneaded material introducing holes are formed, in a circumferential region surrounding the central region of the first die, the first kneaded material introducing holes are formed to pass through the circumferential region of the first die, and in the ring-shaped second die, there are formed second kneaded material introducing holes into which the kneaded material discharged from the first kneaded material introducing holes formed in the circumferential region of the first die is introduced, and latticed second slits communicating with the second kneaded material introducing holes, the honeycomb structure forming die having a clearance region to extrude the kneaded material into a ring shape, between an outer peripheral surface of the convex region of the first die and an inner peripheral surface of the ring-shaped second die, the honeycomb structure forming die further comprising a reticulated member interposed between the first die and the second die, wherein the reticulated member has a cavity region corresponding to the convex region of the first die, wherein movement of the kneaded material is performed between the first kneaded material introducing hole and the second kneaded material introducing hole through meshes of the reticulated member.

2. The honeycomb structure forming die according to claim 1, wherein a shape of the first slits is different from a shape of the second slits.

3. The honeycomb structure forming die according to claim 1, wherein a diameter of a linear material constituting the reticulated member is from 0.030 to 0.500 mm.

4. The honeycomb structure forming die according to claim 1, wherein the number of meshes per centimeter of the reticulated member is from 3.9 to 130.

5. The honeycomb structure forming die according to claim 1, comprising two or more reticulated members, wherein the reticulated member interposed between the first die and the second die is replaced, whereby a distance between the first die and the second die in the extruding direction is changeable.

6. The honeycomb structure forming die according to claim 1, comprising two or more types of second dies which are different in shape of the second slits, wherein the second dies are replaceable.

7. The honeycomb structure forming die according to claim 1, wherein a ratio of an area of the central region of the first die to an area of an end face of a honeycomb formed body which is to be extruded through the forming die is from 30 to 70%.

8. The honeycomb structure forming die according to claim 1, wherein slits surrounding one cell among the first slits and slits surrounding one cell among the second slits extend in mutually intersecting directions.

9. The honeycomb structure forming die according to claim 1, wherein an arranging direction of a cell structure of the honeycomb formed body which is to be extruded through the first slits and an arranging direction of a cell structure of the honeycomb formed body which is to be extruded through the second slits extend in mutually intersecting directions.

10. The honeycomb structure forming die according to claim 1, further comprising a ring-shaped space acquiring member interposed between the first die and the second die, wherein the reticulated member is disposed in an inner region of the ring-shaped space acquiring member.

11. The honeycomb structure forming die according to claim 1, wherein in the first die, the central region is the same as the circumferential region in an opening diameter of the first kneaded material introducing hole and an interval between the first kneaded material introducing holes.

* * * * *